United States Patent [19]

Nakhamkin

[11] Patent Number: 4,870,816

[45] Date of Patent: Oct. 3, 1989

[54] ADVANCED RECUPERATOR

[75] Inventor: Michael Nakhamkin, Fanwood, N.J.

[73] Assignee: Gibbs & Hill, Inc., New York, N.Y.

[21] Appl. No.: 48,849

[22] Filed: May 12, 1987

[51] Int. Cl.$^4$ .............................. F07C 6/16; F02C 7/10
[52] U.S. Cl. ..................................... 60/39.02; 60/727; 60/39.511; 165/145
[58] Field of Search .................. 60/39.511, 727, 39.02; 165/145

[56] References Cited

U.S. PATENT DOCUMENTS

| | | | |
|---|---|---|---|
| 981,546 | 1/1911 | De Ferranti | 60/39.33 |
| 2,947,522 | 8/1960 | Keller | 165/145 |
| 3,822,991 | 7/1974 | Mutchler . | |
| 4,012,191 | 3/1977 | Lisankie et al. . | |
| 4,029,465 | 6/1977 | LaHaye et al. . | |
| 4,043,120 | 8/1977 | Hoffeins | 60/39.142 |
| 4,100,745 | 7/1978 | Gyarmatht et al. . | |
| 4,102,632 | 7/1978 | Hastings . | |
| 4,147,204 | 4/1979 | Pfenninger . | |
| 4,158,145 | 6/1979 | Kartsounes et al. . | |
| 4,237,692 | 12/1980 | Ahrens et al. . | |
| 4,347,706 | 9/1982 | Drost . | |
| 4,353,214 | 10/1982 | Gardner . | |
| 4,361,009 | 11/1982 | Schluderberg . | |
| 4,523,432 | 6/1985 | Frutschi . | |

OTHER PUBLICATIONS

Nakhamkin, M. et al., "Compressed Air Energy Storage: Plant Integration, Turbomachinery Development", ASME International Gas Turbine Symposium and Exhibition, Beijing, Peoples' Republic of China, 1985.

Nakhamkin, M. et al., "Compressed Air Energy Storage: (CAES): Overview, Performance and Cost Data for 25 MW to 220 MW Plants", Joint Power Generation Conference, Toronto, Canada, 1984.

Lukas, H., "Corrosion of Materials in a Simulated CAES Exhaust Gas Environment", ASME Gas Turbine Conference and Exhibit, Houston, Texas, 1985.

Primary Examiner—Donald E. Stout
Attorney, Agent, or Firm—Pennie & Edmonds

[57] ABSTRACT

A heat recuperator is disclosed having a plurality of serially connected tube sections enclosing a gas which is to be heated by exposing the tube sections to a second gas of elevated temperature. Parallel-flow and/or counter-flow sections of tube sections are provided such that the temperature of the tube section does not decrease below the dew point of the second gas. A particularly significant application is in the area of Compressed Air Energy Storage (CAES) systems in which the recuperator is utilized to preheat air from a storage cavern prior to combustion.

23 Claims, 3 Drawing Sheets

ADVANCED RECUPERATOR

CROSS-REFERENCE TO RELATED APPLICATIONS

Related U.S. patent applications are "Retrofit of Simple Cycle Gas Turbines For Compressed Air Energy Storage Application" (Ser. No. 049,650), "Compressed Air Energy Storage Turbomachinery Cycle with Compression Heat Recovery Storage, Steam Generation and Utilization During Power Generation" (U.S. Pat. No. 4,765,142), "Compressed Air Turbomachinery Cycle with Reheat and High Pressure Air Preheating in Recuperator" (Ser. No. 049,870), and "Utilization of Circulating Fluidized Bed Combustors for Compressed Air Energy Storage Application" (Ser. No. 049,649), all of which are filed concurrently and are incorporated herein by reference.

BACKGROUND OF THE INVENTION

This invention relates generally to heat exchangers and more specifically to a heat recuperator in which the temperature of heat transfer tubes contained therein generally does not fall below the dew point of the heating gas. A particularly useful application of such a recuperator is to preheat air in Compressed Air Energy Storage (CAES) systems.

CAES power plants have become effective contributors to a utility's generation mix as a source of peaking or intermediate energy and spinning reserve. CAES plants store off-peak energy from relatively inexpensive energy sources such as coal and nuclear baseload plants by compressing air into storage caverns such as underground reservoirs.

Following off-peak storage, the air is later withdrawn from storage, heated, combined with fuel and expanded through turbine generators to provide needed peaking/intermediate power. Since inexpensive off-peak energy is used to compress the air, the need for premium fuels, such as natural gas and imported oil, is reduced by as much as two thirds compared with conventional gas turbines.

For a more complete discussion of CAES systems, see Nakhamkin, N. et al. "Compressed Air Energy Storage: Plant Integration, Turbomachinery Development", ASME International Gas Turbine Symposium and Exhibition, Beijing, Peoples' Republic of China, 1985 and Nakhamkin, M. et al. "Compressed Air Energy Storage (CAES): Overview, Performance and Cost Data for 25MW to 220MW Plants", Joint Power Generation Conference, Toronto, Canada, 1984, both incorporated herein by reference.

To further increase the efficiency of CAES systems, such systems are provided with heat recuperators which can further reduce premium fuel consumption by as much as twenty-five percent. A recuperator utilizes low pressure turbine exhaust heat as the heating gas for preheating compressed air from the storage cavern prior to entering a high pressure combustor. The high pressure combustor combines the preheated compressed air with fuel and outputs the resulting products of combustion to a high pressure turbine which drives a generator to produce power. Exhaust gas from the high pressure turbine is combined with additional fuel in a low pressure combustor and the products of combustion are directed to a low pressure turbine. The low pressure and high pressure turbines are located on the same shaft and are connected to each other via appropriate gearing, and to the generator via a clutch. The exhaust gas comprising products of combustion of compressed air and fuel from this low pressure turbine is utilized as the heating gas in the recuperator.

The high temperature medium used in such recuperator, namely, the products of combustion (i.e., exhaust gas) output by the low pressure turbine is at approximately atmospheric pressure and generally has a significantly lower heat transfer coefficient than that of the low temperature medium which is high density compressed air illustratively at a pressure between 20 bar and 100 bar, and typically 60 bar. Due to this dissimilarity, the tubes' temperature is much closer to the temperature of the high density low temperature medium than to that of the high temperature medium. As a result, in conventional counterflow recuperators, the tubes' temperature is typically below the acid dew point of the low pressure turbine's exhaust gas, especially in the area where heat transfer takes place between cooled exhaust gas exiting the recuperator and cold compressed air. Since the exhaust gas contains $SO_x$, this enters in reaction with the condensed water on the exterior surface of the tubes, forming sulfuric acid, which in turn causes severe corrosion and ultimately failure of the tubes in the recuperator.

This problem of corrosion is especially of concern in CAES systems due to compressed air temperatures as low as approximately 120° F., significantly less than the acid dew point of the exhaust gas, which illustratively is 250° F. Conventional gas turbine systems generally do not encounter such corrosion since the coldest relevant air temperature, illustratively 700° F., is significantly above the acid dew point.

Various corrosion resistant materials have been suggested to combat this severe problem of corrosion. However, test results indicate that even the most expensive corrosion resistant materials would not last longer than 2000 operating hours. (Lukas, H. "Corrosion of Materials in a Simulated CAES Exhaust Gas Environment", ASME Gas Turbine Conference and Exhibit, Houston, Texas 1985).

An additional proposed solution is disclosed in U.S. Pat. No. 4,523,432 to Frutschi. However, such a solution requires the use of additional equipment including a separate hot water storage device to initially preheat the compressed air prior to entry into the recuperator.

Although known devices to combat corrosion do exist, deficiencies associated with long-term corrosion prevention remain. Present use of corrosion resistant materials and additional preheaters external to the recuperator clearly does not adequately remedy these deficiencies. Corrosion prevention without the need for additional costly preheating devices is most critical to proper operation of any heat recovery system susceptible to corrosion.

SUMMARY OF THE INVENTION

The present invention is a recuperator comprising a plurality of exhaust gas sections, each such section associated with a tubular heat transfer vessel i.e., tube section wherein the temperature of the tubes of the tube section generally does not fall below the acid dew point temperature of an exhaust gas utilized to heat compressed air contained within such tubes. Such a recuperator is advantageously used in Compressed Air Energy Storage (CAES) system.

The temperature of the tubes is prevented from falling below the dew point of the exhaust gas utilized to heat the tubes containing compressed air through efficient utilization of a combination of parallel-flow and counter-flow sections. In a parallel-flow section, compressed air within the tubes flows in a direction generally identical to the direction of exhaust gas flow; in a counter-flow section, compressed air within the tubes flows in a direction generally opposite to the direction of exhaust gas flow.

The recuperator of the present invention comprises a plurality of exhaust gas sections for channeling the high temperature low density exhaust gas which serves as the heating medium. The recuperator further comprises a plurality of serially connected tube sections contained within the exhaust gas sections. Each tube section comprises a plurality of individual tubes. The combination of an exhaust gas section and a corresponding tube section operates either in a parallel-flow manner or a counter-flow manner.

More particularly, an illustrative embodiment of the invention comprises an exhaust gas input section operating in a counter-flow manner, an intermediate section operating in a parallel-flow manner and an exhaust gas output section operating in a counter-flow manner.

The recuperator of the present invention is advantageously used in CAES systems to preheat compressed air from a storage cavern. Such preheated compressed air is subsequently fed into a high pressure combustor, combined with fuel, combusted and expanded in a high pressure turbine. The exhaust gas of the high pressure turbine is input to a low pressure combustor, combined with additional fuel, combusted and expanded in a low pressure turbine. The exhaust gas of the low pressure turbine in a two turbine expansion train utilizing No. 2 fuel oil, which typically has a temperature of 1300° F. at the turbine input and 615° F. at the turbine output, is used as the exhaust gas input to the recuperator to preheat the compressed air and comprises the products of combustion of fuel and compressed air.

Although exhaust gas temperature decreases significantly in the course of the passage of the exhaust gas through the recuperator (typically, from over 600° F. to under 300° F.) and compressed air temperature within the tubes increases significantly during the passage of the compressed air through the recuperator (typically, from approximately 120° F. to approximately 475° F.), it is desirable to keep the temperature of the tubes within a smaller range and, most importantly, above the exhaust gas dew point. Such a scheme of maintaining the temperature of the tubes above the dew point reduces and/or prevents corrosion of the tubes by preventing formation of corrosive agents on the tubes. Recuperators used in CAES systems and incorporating the teachings set forth herein should exhibit lifespans of thirty years, as opposed to typical lifespans of conventional CAES recuperators of two years.

It is therefore a principal object of the present invention to provide a new and improved heat recuperator.

A further object of the present invention is to provide a corrosion resistant heat recuperator.

An additional object of the present invention is to provide a heat recuperator having tubes which operate at or above the dew point of the heating gas.

A further object of the invention is to provide an improved recuperator for use in a Compressed Air Energy Storage (CAES) system.

A still further object of the present invention is to provide a heat recuperator for use in a CAES system whereby corrosion of tubes is prevented through strategic arrangement of a combination of counter-flow and parallel-flow sections, thereby preventing the temperature of the tubes from falling below the heating gas dew point temperature.

BRIEF DESCRIPTION OF THE DRAWINGS

These and other objects, features and advantages of the invention will become more readily apparent with reference to the following description of the invention in which.

DETAILED DESCRIPTION OF THE INVENTION

The present invention comprises a heat recuperator for use in a CAES system having a plurality of heat transfer tube sections wherein the temperature of the tubes does not fall below the dew point of the exhaust gas used to heat the tubes. Such tubes are preferably serially connected and provide a continuous enclosed path having an input into which is introduced the compressed air to be heated and an output through which the heated compressed air is passed.

Figure 1:
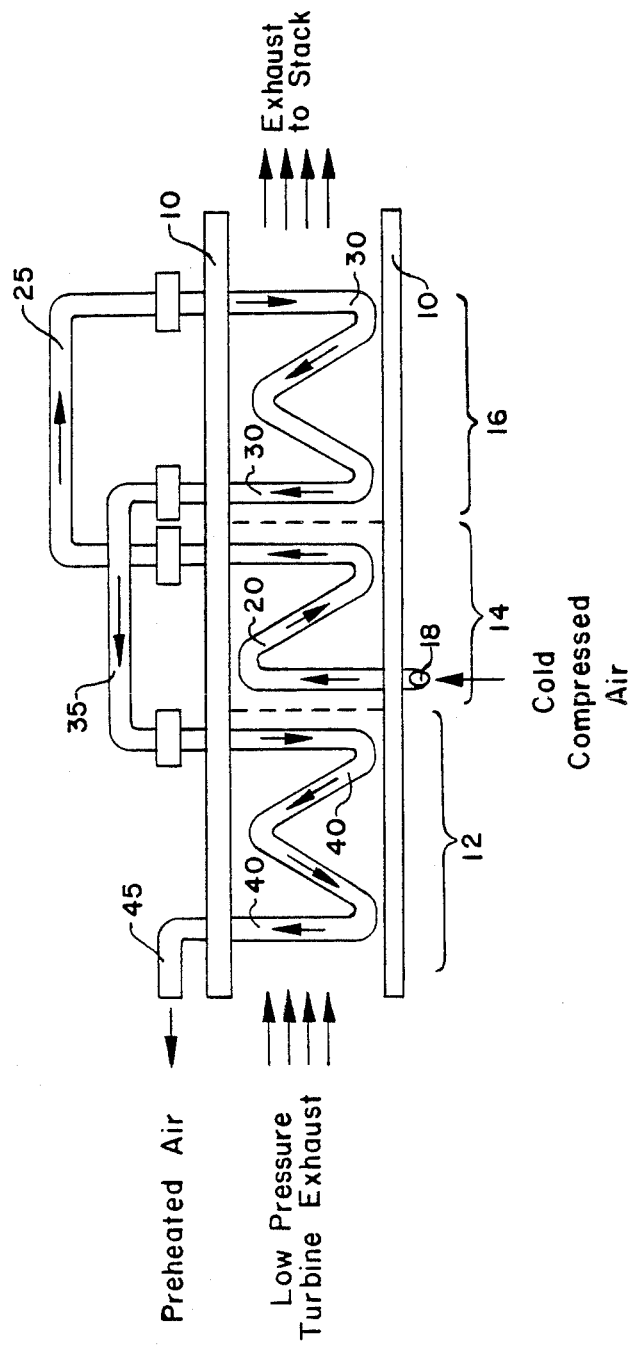
FIG. 1 depicts a first embodiment of the recuperator having a first counter-flow section, a parallel-flow section and a second counter-flow section.

Referring first to FIG. 1, there is depicted a first embodiment of the invention comprising an exhaust gas channel 10 for channeling exhaust gas, a first tube section 20, a second tube section 30 and a third tube section 40.

Exhaust gas channel 10 further comprises an exhaust gas input section 12, an intermediate section 14 and an exhaust gas output section 16. Exhaust gas input section 12 is the hot end of the recuperator, i.e., the section of the recuperator which accepts the exhaust gas which is output by a low pressure turbine and has an elevated temperature. Tube section 40 is generally contained within exhaust gas input section 12 and is arranged in a counter-flow manner, i.e., the flow of the compressed air contained within the tubes of tube section 40 is counter, or opposite, to the flow of the exhaust gas used to heat tube section 40.

Intermediate section 14 comprises a section of exhaust gas channel 10 within which the temperature of the exhaust gas is less than the temperature of the exhaust gas in exhaust gas input section 12 and greater than the temperature of the exhaust in exhaust gas output section 16. Tube section 20 is generally contained within exhaust gas input section 14 and is arranged in a parallel-flow manner, i.e., the flow of the compressed air contained within tube section 20 is parallel and in the same direction as the flow of the exhaust gas used to heat tube section 20.

Exhaust gas output section 16 is the cold end of the recuperator, i.e., the section of the recuperator which discharges the exhaust gas into the environment at a decreased temperature. Tube section 30 is generally contained within exhaust gas output section 16 and is arranged in a counterflow manner.

A continuous path is provided as follows through the tube sections so that cold compressed air may be heated. Cold compressed air from a storage cavern (not shown) enters orifice 18 (at a point where the temperature of tube section 20 is above the acid dew point of the exhaust gas) and flows through first tube section 20 within parallel-flow intermediate section 14, continually increasing in temperature until approximately reaching the approximate acid dew point temperature. Connecting member 25 then passes the warmed compressed air from first tube section 20 to second tube section 30 within counter-flow cold end exhaust gas output section 16 where it is further heated. Although the exhaust gas temperature is at a minimum at the exhaust output end of exhaust gas output section 16, illustratively 266° F., it is above the exhaust gas dew point. Similarly, the temperature of the compressed air at the point of input to tube section 30 is approximately at least equal to the acid dew point temperature. Therefore, tube section 30 will have a temperature, at its point of input to exhaust gas output section 16, greater than the exhaust gas dew point temperature. Since the temperature of tube section 30 increases in the counter flow direction, the temperature of tube section 30 never falls below the dew point temperature.

Connecting member 35 then passes the heated compressed air from second tube section 30 to third tube section 40 within counter-flow hot end exhaust gas input section 12 for final heating. Since this is the hottest end of exhaust gas channel 10, and since the compressed air is already above the acid dew point, the temperature of tube section 40 is never below the acid dew point. The heated compressed air exits tube section 40 through orifice 45 and is subsequently passed to a combustor (not shown) where it is combined with fuel, combusted and input to a turbine of a typical CAES system.

Connecting members 25, 35 may be provided with valves, dampers, adjustable orifices and the like in order to more accurately control compressed air flow rates and thereby maintain tube temperatures above the exhaust gas dew point. It is to be understood that the tubes of the tube sections may take on a variety of forms. Additionally, a heat dissipating/absorbing finning arrangement is preferably provided wherein different tube sections have different amount of fins depending on exhaust gas temperature, tube temperature and compressed air temperature in the vicinity of a particular tube section. Such a finning arrangement is illustratively of the shell and tube or fin-plate type.

The relative dimensions of the three exhaust gas sections as well as the tube sections and the points at which the compressed air is input, output and transferred between exhaust gas sections are chosen to prevent acid dew, achieve maximum thermal effectiveness and make best use of the temperature differentials available within each exhaust gas section. Mechanical and thermal parameters associated with the first embodiment depicted in FIG. 1 are presented in Table I, which relates to the operation of an illustrative system combusting No. 2 fuel oil, having an exhaust gas dew point temperature of approximately 250° F. and having compressed air input to a high pressure turbine at a pressure of 45 bar.

TABLE I

|  | EXHAUST INPUT SECTION | INTERMEDIATE SECTION | EXHAUST OUTPUT SECTION |
| --- | --- | --- | --- |
| THERMAL | | | |
| COMPRESSED AIR | | | |
| lb/hr | 632520 | 632520 | 632520 |
| °F. in | 292 | 120 | 253 |
| °F. out | 475 | 253 | 292 |
| OPERATING PRESSURE, psia | 661 | 661 | 661 |
| PRESSURE DROP, psi | | 18 | |
| GAS TURBINE EXHAUST | | | |
| lb/hr | 642600 | 642600 | 642600 |
| °F. in | 615 | 437.3 | 305.7 |
| °F. out | 437.3 | 305.7 | 266.8 |
| GAS PRESSURE DROP IN. WATER COLUMN, psi | | 9.35 | |
| DUTY, mmBtu/hr | 28.72 | 20.87 | 6.12 |
| LMTD, °F. | 139.8 | 145 | 13.5 |
| INTERNAL SURFACE AREA, ft$^2$ | 3979 | 2984 | 8938 |
| HEAT TRASNFER RATE | | | |
| Btu/ft$^2$-hr-°F. | 51.6 | 48.2 | 50.7 |
| MECHANICAL | | | |
| DESIGN PRESSURE, psig | 715 | 715 | 715 |
| DESIGN TEMPERATURE, °F. | 650 | 650 | 650 |
| TUBES | | | |
| Number of Ducts | 1 | 1 | 2 |
| Tubes/Row | 26 | 26 | 26 |
| Rows | 12 | 9 | 24 |
| No. Tubes Total | 312 | 234 | 624 |
| O.D., in. | 2.25 | 2.25 | 2.5 |
| I.D., in. | 2.03 | 2.03 | 2.28 |
| Material | CS | CS | CS |
| FINS (SEGMENTED) | | | |
| Height, in. | 0.75 | 0.75 | 0.75 |
| Segmented Width, in. | 0.3125 | 0.3125 | 0.3125 |
| Spacing, fins/in. | 5 | 5 | 5 |
| Material | CS | CS | CS |
| Finned Length, ft. | 24 | 24 | 24 |

Figure 2:
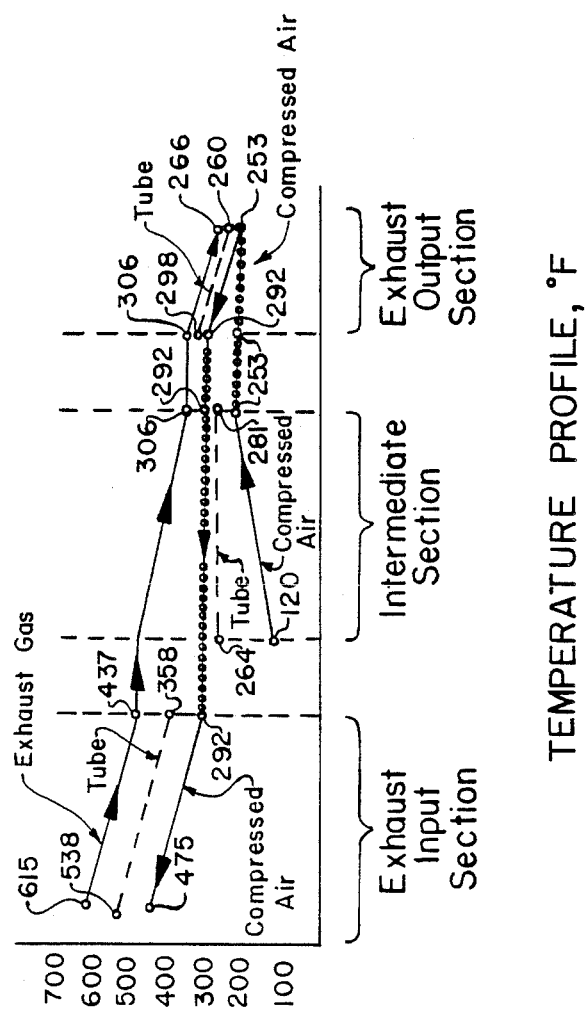
FIG. 2 is a chart of the temperature of the compressed air, exhaust gas and tubes at various locations within the recuperator of FIG. 1.

FIG. 2 represents the temperature of the compressed air, exhaust gas and tube sections at various locations within the exhaust gas channel, all relating to the first embodiment depicted in FIG. 1, in which the exhaust gas dew point is approximately 250° F. More particularly, compressed air having illustrative temperature of 120° F. and pressure 661 psia (45 bar) is output by a storage device and input to a parallel-flow intermediate section at a point where the temperature of the exhaust gas is 437° F., resulting in a tube temperature of 264° F. The compressed air is then heated and exits the intermediate section at 253° F. at a point where the temperature of the exhaust gas is 306° F., resulting in a tube temperature of 281° F. This compressed air then enters a counter-flow exhaust gas output section at 253° F. at a point where the temperature of the exhaust gas is 266° F., resulting in a tube temperature of 260° F. This compressed air is then heated and exits the exhaust gas output section at 292° F. at a point where the temperature of the exhaust gas is 306° F., resulting in a tube temperature of 298° F. This compressed air then enters a counter-flow exhaust gas input section at 292° F. at a point where the temperature of the exhaust gas is 437° F., resulting in a tube temperature of 358° F. This compressed air is then heated and exits the exhaust gas input section at 475° F. at a point where the temperature of the exhaust gas is 615° F., resulting in a tube temperature of 538° F.

The present invention maintains tube temperature in excess of the exhaust gas dew point temperature by initially heating the compressed air in a parallel-flow section of the recuperator until the compressed air temperature is near or above the exhaust gas dew point. This parallel-flow section is placed sufficiently near the hot end section of the exhaust gas channel such that its tube section is provided with exhaust gas having a temperature which is sufficient to maintain the tubes at temperatures near or above the dew point. However, placement of the parallel-flow section unnecessarily near to the hot end section of the exhaust gas channel, although in accordance with the practice and within the scope of the present invention, will provide a reduced recuperator effectiveness as will be discussed, infra.

As set forth in Table I, the actual number of individual tubes comprising the tube sections of the three exhaust gas sections is not identical. For example, 234 individual tubes are utilized in tube section 20 of the intermediate section 14 while 624 individual tubes are utilized in tube section 30 of the exhaust gas output section 16 This increase in the number of individual tubes in the exhaust gas output section over the number of such tubes in the intermediate section partially accounts for the corresponding increase in heat transfer rate, as set forth in Table I. Such an unequal arrangement is provided in order to insure tube temperatures above that of the exhaust gas dew point while maintaining an overall efficient thermal energy transfer system.

More specifically, a conventional counterflow only system having an identical number of individual tubes and associated heat absorbing/dissipating fins in each of the three exhaust gas sections would result in unnecessarily high tube temperatures in the exhaust gas input section and tube temperatures below the dew point of the exhaust gas in the exhaust gas output section. To prevent such and to maintain tube temperatures above the exhaust gas dew point, the arrangement set forth in Table I is utilized to provide the desirable operating characteristics in FIG. 2.

Since less heat is removed from the exhaust gas in the exhaust gas input section of the present invention (as opposed to the above-described conventional counterflow system), the temperature of the exhaust gas entering the intermediate section is higher and the tube temperature is above the dew point. Proper use of finned external surface area in the intermediate section maintains the minimum tube temperature above the dew point. For the exhaust gas output section, the external surface area of the finned tubing would have to be increased to maintain the tube temperature above the dew point.

Essentially, this technique of optimizing heat transfer rates through various tube/fin arrangements within the various exhaust gas sections and initially heating the compressed air in a parallel-flow section until approximately reaching the exhaust gas dew point provides for less heat transfer in the first two exhaust gas sections than conventional counterflow only recuperators, with the balance being picked up by the exhaust gas output section, thus causing the minimum tube temperature to equal or exceed the dew point in all three exhaust gas sections. Table II summarizes the results of the tube temperature analysis for the full length of the recuperator.

TABLE II

| TUBE TEMPERATURES | |
|---|---|
| REFERENCE POINT* | TUBE TEMPERATURE |
| Input Inlet | 538° F. |
| Section: Outlet | 358° F. |
| Intermediate Inlet | 264° F. |
| Section: Outlet | 281° F. |
| Output Inlet | 298° F. |
| Section: Outlet | 260° F. |

*Inlet and outlet are in reference to the exhaust gas flow.

An analysis of the heat transfer surface shows that the output exhaust gas section accounts for over fifty percent of the total heat transfer surface area of the recuperator, yet transfers only eleven percent of the total duty. This data is indicative of a system where maximum heat recovery is the prime objective. An attempt to increase heat recovery further would cause the logarithmic mean temperature difference (LMTD) to diminish rapidly causing a large increase in surface area for a modest gain in temperature effectiveness. This thermal and economic situation determined the recuperator effectiveness of approximately seventy-five percent to be the most economical. An effectiveness of seventy-five percent represents the ratio of heat exchanged to the total heat available in the exhaust gas to be utilized for air preheating.

Figure 3:
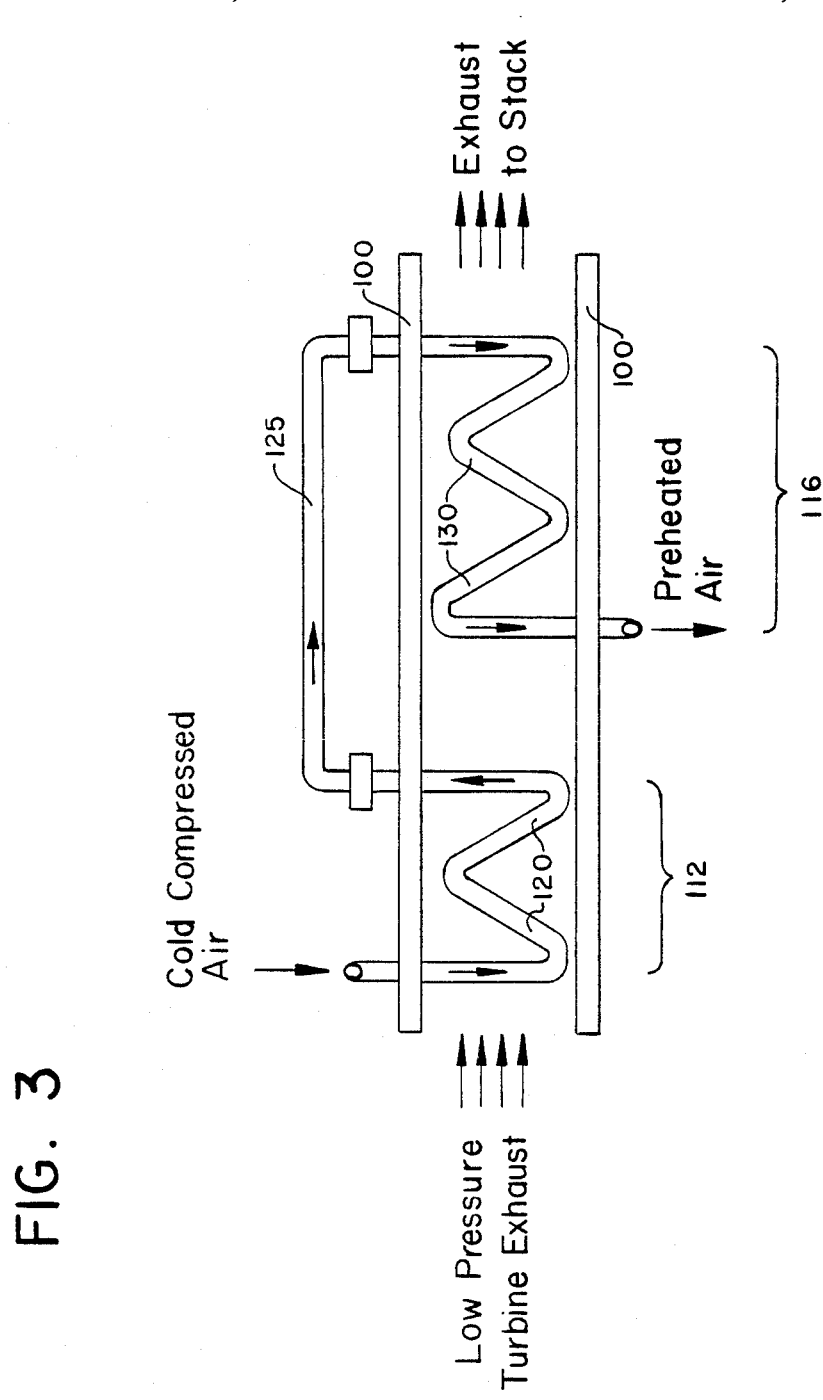
FIG. 3 depicts a second embodiment of the recuperator having a parallel-flow section and a counter-flow section.

FIG. 3 depicts a second embodiment of the invention comprising an exhaust gas channel 100 for channeling exhaust gas, a first tube section 120 and a second tube section 130.

Exhaust gas channel 100 further comprises an exhaust gas input section 112 and an exhaust gas output section 116. In this particular embodiment, exhaust gas input section 112 is the hot end of the recuperator which accepts the exhaust gas which is output by a low pressure turbine and has an elevated temperature while exhaust gas output section 116 is the cold end of the recuperator which discharges the exhaust gas having a decreased temperature. Tube section 120 is generally contained within exhaust gas input section 112 and is arranged in a parallel-flow manner. Tube section 130 is generally contained within exhaust gas output section 116 and is arranged in a counter-flow manner. Connecting member 125 provides a continuous path from tube section 120 to tube section 130.

In the practice of the second embodiment of the invention, compressed air is introduced to the recuperator through an input of tube section 120 in a parallel-flow manner at a point where the exhaust gas has its highest temperature. This compressed air is fed and travels essentially parallel to the exhaust gas flow until the air approximately reaches the dew point temperature. The compressed air then exits tube section 120 and enters tube section 130 situated at the cold end of the recuperator in a counter-flow manner by way of connecting member 125. The recuperator effectiveness associated with the second embodiment is approximately 69.5 percent.

Since materials, dimensions and parameters of the recuperator depend largely on the characteristics of the system in which it will be used, the materials, dimensions and parameters set forth herein are not absolute, but rather are illustrative and meant to provide the reader with an appreciation of the interaction among such materials, dimensions and parameters.

Thus it can be seen that there is provided a recuperator for preheating compressed air in a CAES system whereby corrosion prevention is accomplished without the need of costly corrosion resistant materials or additional preheating devices upstream from the recuperator.

In addition, it is to be understood that the invention can be carried out by specifically different equipment and devices and that various modifications, both as to equipment details and operating procedures can be effected without departing from the spirit and scope of the claimed invention.

What is claimed is:

1. A heat recuperator for transferring heat comprising:
    a heat-transfer vessel enclosing a first gas having high density and low temperature to be raised in temperature, said heat-transfer vessel having at least first and second serially connected tube sections;
    channel means for directing the flow of a heating gas having high temperature and low density in close proximity to said tube sections for heat exchange therewith, said first gas initially having a temperature below a dew point of said heating gas as said first gas enters said heat-transfer vessel, said channel means having at least first and second sections corresponding to said first and second tube sections with the first channel section closer to a heating gas input and the second channel section closer to a heating gas output;
    wherein at least one of said tube sections and said corresponding channel section operates in a parallel-flow manner for initially heating said first gas and wherein the temperature of surfaces of said heat-transfer vessel exposed to said heating gas does not fall below the dew point of said heating gas.

2. The heat recuperator of claim 1 wherein at least one of said tube sections and said corresponding channel section operates in a counter-flow manner for subsequently heating said heated first gas.

3. The heat recuperator of claim 2 wherein said first tube section and said first channel section operate in parallel-flow manner and said second tube section and said second channel section operate in counter-flow manner.

4. The heat recuperator of claim 2 wherein said first gas is pressurized at a level approximately between 20 bar and 100 bar.

5. The heat recuperator of claim 3 wherein said tube sections transfer heat from said heating gas to said first gas.

6. The heat recuperator of claim 5 wherein said dew point of said heating gas is approximately between 200° F. and 280° F.

7. The heat recuperator of claim 1 wherein said first gas is compressed air from a storage cavern and said heating gas is an exhaust gas from a turbine.

8. The heat recuperator of claim 7 wherein said turbine is a low pressure turbine.

9. A heat recuperator for use in a Compressed Air Energy Storage (CAES) system comprising:
    a hot end input means for the input of an exhaust gas having an elevated temperature and low density;
    a cold end output means for the output of said exhaust gas wherein said exhaust gas has a decreased temperature;
    a parallel-flow section positioned within said hot end input means comprising a first tube section, said first tube section being exposed to said exhaust gas; and
    a counter-flow section positioned within said cold end output means comprising a second tube section serially connected to said first tube section downstream of said first tube section and being exposed to said exhaust gas, said parallel-flow section and said counter-flow section providing for the flow therethrough of a high density and low temperature fluid to be heated by said exhaust gas from an initial temperature below a dew point of said exhaust gas,
    wherein the temperature of surfaces of said first and second tube sections exposed to said exhaust gas does not fall below the dew point of said exhaust gas.

10. The heat recuperator of claim 9 wherein said dew point is approximately between 200° F. and 280° F.

11. The heat recuperator of claim 9 wherein said fluid is pressurized to a level approximately between 20 bar and 100 bar.

12. A heat recuperator for use in a Compressed Air Energy Storage (CAES) system comprising:
    a hot end input means for the input of an exhaust gas having an elevated temperature;
    a cold end output means for the output of said exhaust gas wherein said exhaust gas has a decreased temperature;
    an intermediate connection means connecting said hot end input means to said cold end output means;
    a parallel-flow section positioned within said intermediate connection means comprising a first tube section, said first tube section being exposed to said exhaust gas;
    a first counter-flow section positioned within said cold end output means comprising a second tube section connected to said first tube section, said second tube section being exposed to said exhaust gas; and
    a second counter-flow section positioned within said hot end input means comprising a third tube section connected to said second tube section, said third tube section being exposed to said exhaust gas, said parallel-flow section, said first counter-flow section and said second counter-flow section providing for the flow therethrough of a fluid to be heated by said exhaust gas.

13. The heat recuperator of claim 12 wherein the temperature of said first, second and third tube sections does not decrease below a dew point of said exhaust gas.

14. The heat recuperator of claim 13 wherein said dew point is approximately between 200° F. and 280° F.

15. The heat recuperator of claim 12 wherein said fluid is pressurized to a level approximately between 20 bar and 100 bar.

16. A method for heating high density and low temperature compressed air in a recuperator having a plurality of exhaust gas sections, each such section having associated therewith a tube section which is sufficiently heated so as to prevent the formation of corrosive condensate thereon, comprising the steps of:

heating said compressed air initially in a first exhaust gas section and corresponding tube section wherein said first exhaust gas section and corresponding tube section operate in a parallel-flow manner; and heating said initially heated air in a second exhaust gas section and corresponding tube section serially connected to said tube section of said first exhaust gas section, wherein said second exhaust gas section and corresponding tube section operate in a counter-flow manner;

wherein said tube sections transfer heat from an exhaust gas having high temperature and low density within said recuperator to said compressed air and the temperature of surfaces of said tube sections exposed to said exhaust gas does not decrease below a dew point of said exhaust gas.

17. The method of claim 16 wherein said compressed air is pressurized to a level approximately between 20 bar and 100 bar.

18. The method of claim 16 wherein said dew point of said exhaust gas is approximately between 200° F. and 280° F.

19. The method of claim 16 wherein the steps of heating said compressed air and heating said initially heated air are performed by exposing said tube sections to exhaust gas output by a turbine.

20. The method of claim 19 wherein the step of exposing said tube sections to exhaust gas comprises exposing said tube sections to exhaust gas output by a low pressure turbine.

21. The method of claim 16 wherein exhaust gas first heats said tube section of said first exhaust gas section and then heats said tube section of said second exhaust gas section.

22. The method of claim 16 wherein the temperature of said tube sections does not decrease below approximately 200° F.

23. The method of claim 16 wherein the temperature of said tube sections does not decrease below approximately 280° F.

* * * * *